United States Patent
Lockett et al.

(10) Patent No.: US 9,682,514 B2
(45) Date of Patent: Jun. 20, 2017

(54) METHOD OF MANUFACTURING RESIN INFUSED COMPOSITE PARTS USING A PERFORATED CAUL SHEET

(71) Applicant: The Boeing Company, Chicago, IL (US)

(72) Inventors: Peter J. Lockett, Fairfield (AU); David Pook, Malvern East (AU); Andrew K. Glynn, North Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 670 days.

(21) Appl. No.: 13/905,630

(22) Filed: May 30, 2013

(65) Prior Publication Data

US 2013/0264751 A1    Oct. 10, 2013

Related U.S. Application Data

(63) Continuation-in-part of application No. 12/944,089, filed on Nov. 11, 2010, now Pat. No. 8,940,213.

(51) Int. Cl.
*B29C 70/02*    (2006.01)
*B29C 70/44*    (2006.01)
*B29C 70/54*    (2006.01)

(52) U.S. Cl.
CPC ......... *B29C 70/021* (2013.01); *B29C 70/443* (2013.01); *B29C 70/548* (2013.01)

(58) Field of Classification Search
None
See application file for complete search history.

(56) References Cited

U.S. PATENT DOCUMENTS

| | | |
|---|---|---|
| 2,709,973 A | 6/1955 | Meyer et al. |
| 3,339,333 A | 9/1967 | Kovalcik |
| 3,775,238 A | 11/1973 | Lyman |
| 3,890,749 A | 6/1975 | Gunther |
| 4,132,755 A | 1/1979 | Johnson |
| 4,357,292 A | 11/1982 | Myers |
| 4,606,961 A | 8/1986 | Munsen et al. |
| 4,942,013 A | 7/1990 | Palmer et al. |

(Continued)

FOREIGN PATENT DOCUMENTS

| | | |
|---|---|---|
| CN | 101772452 A | 7/2010 |
| EP | 2452808 A1 | 5/2012 |

(Continued)

OTHER PUBLICATIONS

Final Office Action, dated May 6, 2013, regarding U.S. Appl. No. 13/012,162, 28 pages.

(Continued)

*Primary Examiner* — Matthew Daniels
*Assistant Examiner* — Kimberly A Stewart
(74) *Attorney, Agent, or Firm* — Yee & Associates, P.C.

(57) ABSTRACT

Resin infused composite parts are fabricated using a caul sheet having perforations therein for optimizing the flow of resin through the parts. The method allows for a simplified tooling and consumable arrangement for complex parts while achieving a smooth, aerodynamic caul-side or bag-side finish. The component may be placed in direct contact with a tool, and the caul sheet may be placed in direct contact with the component thereby eliminating the necessity for consumables between these items.

27 Claims, 5 Drawing Sheets

(56) References Cited

U.S. PATENT DOCUMENTS

| | | |
|---|---|---|
| 5,149,965 A | 9/1992 | Marks |
| 5,419,965 A | 5/1995 | Hampson |
| 5,567,499 A | 10/1996 | Cundiff et al. |
| 5,569,508 A | 10/1996 | Cundiff |
| 5,601,852 A | 2/1997 | Seemann |
| 5,771,680 A | 6/1998 | Zahedi et al. |
| 5,851,336 A | 12/1998 | Cundiff et al. |
| 5,928,767 A * | 7/1999 | Gebhardt ............... B32B 15/08 174/258 |
| 6,156,146 A | 12/2000 | Cundiff |
| 6,319,447 B1 | 11/2001 | Cundiff et al. |
| 6,415,496 B1 | 7/2002 | Dominguez Casado et al. |
| 6,561,478 B2 | 5/2003 | Cundiff et al. |
| 6,586,054 B2 | 7/2003 | Walsh |
| 6,589,618 B2 | 7/2003 | Cundiff et al. |
| 6,610,229 B1 * | 8/2003 | Morales .................. B29B 11/16 264/101 |
| 6,627,142 B2 | 9/2003 | Slaughter et al. |
| 6,811,733 B2 | 11/2004 | Nelson et al. |
| 6,840,750 B2 | 1/2005 | Thrash et al. |
| 6,872,340 B2 | 3/2005 | Cundiff et al. |
| 6,896,841 B2 | 5/2005 | Velicki et al. |
| 7,074,474 B2 | 7/2006 | Toi et al. |
| 7,080,805 B2 | 7/2006 | Prichard et al. |
| 7,138,028 B2 | 11/2006 | Burpo et al. |
| 7,334,782 B2 | 2/2008 | Woods et al. |
| 7,413,695 B2 | 8/2008 | Thrash et al. |
| 7,419,627 B2 | 9/2008 | Sheu et al. |
| 7,510,757 B2 | 3/2009 | Lee et al. |
| 7,633,040 B2 | 12/2009 | Glain et al. |
| 7,682,682 B2 | 3/2010 | Leon-Dufour et al. |
| 8,042,315 B2 | 10/2011 | Ashton et al. |
| 8,042,767 B2 | 10/2011 | Velicki et al. |
| 8,043,453 B2 | 10/2011 | Sawicki et al. |
| 8,091,603 B2 | 1/2012 | Pham et al. |
| 8,182,628 B2 | 5/2012 | Biornstad et al. |
| 8,267,354 B2 | 9/2012 | Kallinen et al. |
| 8,302,909 B2 | 11/2012 | Cazeneuve et al. |
| 8,424,806 B2 | 4/2013 | Outon Hernandez et al. |
| 8,628,717 B2 | 1/2014 | Pook et al. |
| 8,636,252 B2 | 1/2014 | Lockett et al. |
| 8,940,213 B2 | 1/2015 | Pook et al. |
| 2003/0025231 A1 | 2/2003 | Slaughter et al. |
| 2003/0025232 A1 | 2/2003 | Slaughter et al. |
| 2004/0032062 A1 | 2/2004 | Slaughter et al. |
| 2004/0219244 A1 | 11/2004 | Filsinger et al. |
| 2005/0003145 A1 | 1/2005 | Toi et al. |
| 2005/0031720 A1 | 2/2005 | Lippert et al. |
| 2005/0073076 A1 | 4/2005 | Woods et al. |
| 2005/0211846 A1 | 9/2005 | Leon-Dufour et al. |
| 2006/0125155 A1 | 6/2006 | Sekido et al. |
| 2007/0108665 A1 | 5/2007 | Glain et al. |
| 2008/0246175 A1 | 10/2008 | Biornstad et al. |
| 2009/0044914 A1 | 2/2009 | Pham et al. |
| 2009/0057487 A1 | 3/2009 | Velicki et al. |
| 2009/0200425 A1 | 8/2009 | Kallinen et al. |
| 2010/0024958 A1 | 2/2010 | Sawicki et al. |
| 2010/0108245 A1 | 5/2010 | Nishiyama et al. |
| 2010/0170989 A1 | 7/2010 | Gray |
| 2011/0311782 A1 | 12/2011 | Richmond et al. |
| 2011/0315824 A1 | 12/2011 | Pook et al. |
| 2012/0052247 A1 | 3/2012 | Pook et al. |
| 2012/0119422 A1 | 5/2012 | Lockett et al. |
| 2012/0234978 A1 | 9/2012 | Hernando Navas et al. |
| 2015/0125565 A1 | 5/2015 | Lockett et al. |
| 2015/0328846 A1 | 11/2015 | Pook et al. |

FOREIGN PATENT DOCUMENTS

| | | | | |
|---|---|---|---|---|
| JP | 2004-181627 | * | 7/2004 | ........... B29C 70/443 |
| JP | 2004181627 A | | 7/2004 | |
| JP | 2007118598 A | | 5/2007 | |
| JP | 2007176163 A | | 7/2007 | |
| NL | 1001725 C2 | | 5/1997 | |
| WO | WO2004011169 A2 | | 2/2004 | |
| WO | WO2006096647 A2 | | 9/2006 | |
| WO | WO2008114809 A1 | | 9/2008 | |
| WO | WO2010060908 A2 | | 6/2010 | |
| WO | WO2011003844 A1 | | 1/2011 | |
| WO | WO2011162884 A2 | | 12/2011 | |

OTHER PUBLICATIONS

EP examination communication dated May 6, 2013 regarding application 11187924.3-1706, applicant The Boeing Company, 5 pages.
Office Action, dated Jun. 4, 2014, regarding U.S. Appl. No. 12/944,089, 22 pages.
Notice of Reasons for Rejection and English Translation, issued Aug. 4, 2015, regarding Japanese Patent Application No. 2013-550467, 5 pages.
International Preliminary Report on Patentability, dated Jul. 30, 2013, regarding Application No. PCT/US2011/063658, 7 pages.
Notice of Allowance, dated Sep. 20, 2013, regarding U.S. Appl. No. 13/012,162, 12 pages.
Notice of Allowance, dated Oct. 3, 2014, regarding U.S. Appl. No. 12/944,089, 9 pages.
International Search Report, dated Sep. 26, 2011, regarding Application No. PCT/US2011/036191 (WO2011162884), 10 pages.
European Search Report, dated Feb. 16, 2012, regarding Application No. EP11187924 (EP2452808), 8 pages.
International Search Report, dated May 3, 2012, regarding Application No. PCT/US2011/063658 (WO2012102789), 12 pages.
Byrd et al., "The estimate of the effect of z-pins on the strain release rate, fracture, and fatigue in a composite co-cured z-pinned double cantilever beam," Composites Structures, 2005, vol. 68, No. 1, pp. 53-63.
Campbell, "Cure Tooling," In: Manufacturing Processes for Advanced Composites, 2004. Elsevier Ltd., Oxford, pp. 128-129.
Han et al., "Resin film infusion of stitched stiffened composite panels," Composites Part A: Applied Science and Manufacturing, 2003, vol. 34, pp. 227-236.
Higgins et al., "Design and testing of the Minotaur advanced grid-stiffened fairing," Composite Structures, 2004, vol. 66, No. 1-4, pp. 339-349.
Key et al., "Progressive failure predictions for rib-stiffened panels based on multicontinuum technology," Composite Structures, 2004, vol. 65, No. 3-4, pp. 357-366.
Mouritz, "Review of z-pinned composite laminates," Composites Part A: Applied Science and Manufacturing, 2007, vol. 38, No. 12, pp. 2383-2397.
Sheppard et al., "Rib separation in postbuckling stiffened shear panels," Composite Structures, 1998, vol. 41, No. 3-4, pp. 339-352.
Stickler et al., "Investigation of mechanical behavior of transverse stitched T-joints with PR520 resin in flexure and tension," Composite Structures, 2001, vol. 52, No. 3-4, pp. 307-314.
Office Action, dated Aug. 16, 2012, regarding U.S. Appl. No. 12/944,089, 26 pages.
Final Office Action, dated Dec. 21, 2012, regarding U.S. Appl. No. 12/944,089, 24 pages.
Notice of Reasons for Rejection and English Translation dated Apr. 15, 2015, regarding Japanese Patent Application No. 2011-238929, 5 pages.
State Intellectual Property Office of PRC Notification of First Office Action and English Translation, dated Mar. 6, 2015, regarding Application No. 201180065886.2, 15 pages.
State Intellectual Property Office of PRC Notification of First Office Action and English Translation, dated Apr. 3, 2015, regarding Application No. 201110349327.6, 23 pages.
Office Action, dated Nov. 6, 2015, regarding U.S. Appl. No. 14/141,433, 34 pages.
Extended European Search Report, dated Nov. 30, 2015, regarding Application No. EP14162269.6, 8 pages.
Notice of Allowance, dated May 17, 2016, regarding U.S. Appl. No. 14/141,433, 7 pages.

(56) References Cited

OTHER PUBLICATIONS

Office Action, dated Jul. 1, 2016, regarding U.S. Appl. No. 14/594,129, 28 pages.
Notice of Allowance, dated Jan. 19, 2017, regarding U.S. Appl. No. 14/594,129, 19 pages.
Notice of Reasons for Rejection and English Translation, dated Mar. 14, 2017, Regarding Application No. 2016-073950, 9 pages.

* cited by examiner

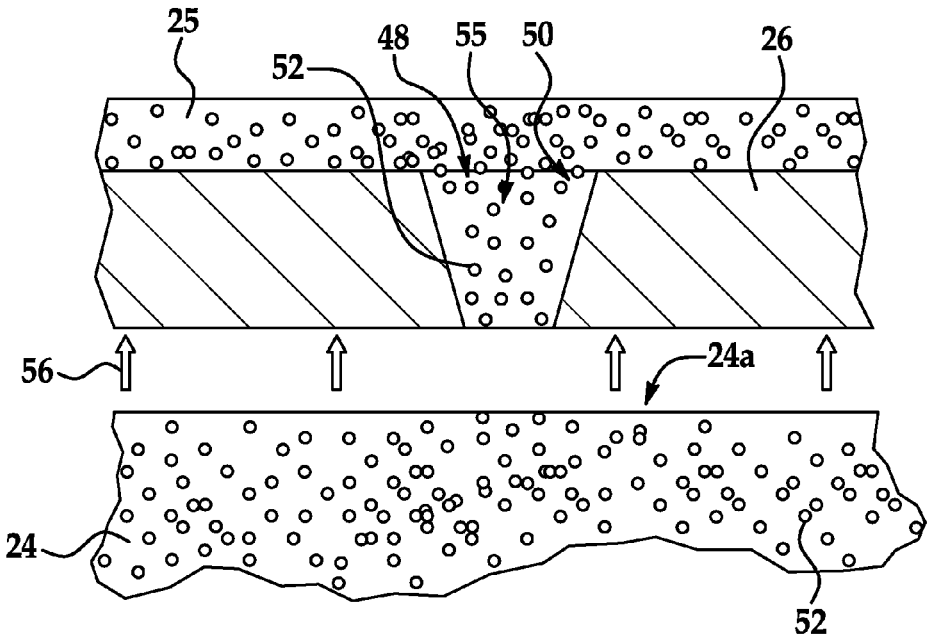
FIG. 5
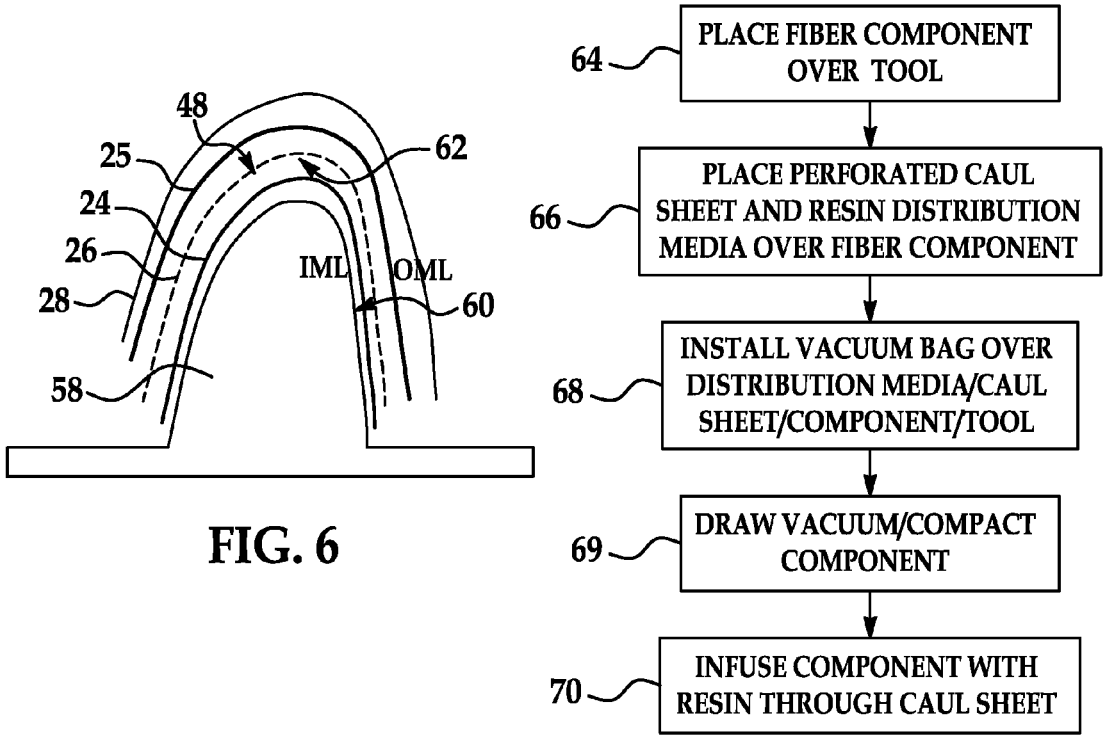
FIG. 6
FIG. 7

METHOD OF MANUFACTURING RESIN INFUSED COMPOSITE PARTS USING A PERFORATED CAUL SHEET

CROSS REFERENCE TO RELATED APPLICATIONS

This application is a continuation-in-part of patent application U.S. Ser. No. 12/944,089, filed Nov. 11, 2010, now U.S. Pat. No. 8,940,213 entitled "RESIN INFUSION OF COMPOSITE PARTS USING A PERFORATED CAUL SHEET," which is incorporated herein by reference.

This application is related to co-pending U.S. patent application Ser. No. 12/823,414 filed Jun. 25, 2010, now U.S. Pat. No. 8,628,717, the entire disclosure of which is incorporated by reference herein.

TECHNICAL FIELD

This disclosure generally relates to fabrication of composite structures, especially using resin infusion techniques, and deals more particularly with a perforated caul sheet for optimizing the flow of resin through a fiber component.

BACKGROUND

One technique for fabricating composite parts involves infusing a dry fiber component with resin using a process referred to as resin infusion. In one variation of this process, referred to as vacuum assisted resin infusion, after the fiber component is vacuum bagged on a tool, a vacuum is drawn which both compacts the fiber component and draws resin through the component to produce a compacted, resin infused part.

The resin infusion process may present several problems in some applications. One of these problems involves the need to use a peel ply which may have a tendency to restrict the flow of resin from the resin source into the component being infused. Another problem relates to difficulties in tailoring the resin flow across the area of the component due to the fact that resin distribution media tend to distribute the resin uniformly across the area of the fiber component. This uniformity of resin flow may result in "trap-off" of certain areas of the component, sometimes referred to as "resin starvation", caused by resin-infused areas isolating adjacent dry areas from active vacuum paths. Another problem involves the need for locating resin supply components, such as channels, tubing and runners off of the fiber component so that they do not leave any mark-off on the infused part. Locating these resin supply components off of the fiber component may limit resin supply, may increase infusion distances and may increase infusion time while restricting optimization of the resin supply for a particular component.

Still another problem with existing resin infusion processes results from the need for placing a flexible peel ply and a flexible resin distribution media in contact with the fiber component. This direct contact may result in a relatively rough surface finish on the part, commonly known as the bag side finish, which may be unacceptable in applications where a smooth surface finish is required, such as in aircraft applications requiring an aerodynamic surface finish.

Another problem arises in connection with infusion of integrated components comprising multiple parts. In the case of integrated components, prior infusion techniques that used simple tooling required a complex bagging and/or consumable arrangement, while those that used a simple bagging/consumable arrangement required complex tooling.

Accordingly, there is a need for a method and apparatus for resin infusion which may eliminate the need for a peel ply while allowing optimization of the resin supply across the area of the fiber component, hence controlling the quantity of resin supplied to particular regions on the component. There is also a need for resin infusion apparatus that increases tooling flexibility by locating resin supply hardware directly on top of the component being infused without causing part mark-off while providing a smooth cured part finish.

SUMMARY

The disclosed embodiments provide a method and apparatus for resin infusion which enables precise, tailored resin supply to a fiber component, resulting in reduced infusion times while simultaneously providing a smooth, aerodynamic surface finish on the bag side of the component and enabling simplified tooling for complex components. The reliability of successful infusion of parts may be improved, which may reduce scrap rework and repair. The method and apparatus simplify layup of consumables, which may reduce fabrication and labor cost. By providing infusion media with tailored permeability in different zones of the fiber component, the disclosed embodiments may allow a wider range of components to be resin infused, while reducing the complexity of internal tooling and potential wrinkling consumables. The embodiments may also allow more favorable tooling arrangements while achieving a relatively smooth, OML surface finish on the side of the fiber component from which resin is infused. The embodiments provide additional advantages in the case of resin infusion of complex parts such as those having integrated components. Integrated components may be resin infused using both simple tooling and simple arrangements of bagging and consumables, while achieving a smooth aerodynamic caul-side or bag-side finish.

According to one embodiment, apparatus is provided for fabricating resin infused composite parts comprising a caul sheet having perforations therein for controlling the flow of resin through a fiber component. The perforations may have a tapered cross section, and may be non-uniformly located over the area of the caul sheet.

According to another embodiment, a method is provided of fabricating resin infused composite parts. The method comprises placing a fiber component on the tool, placing a perforated caul sheet over the component, and infusing the component with resin through perforations in the caul sheet. The method may further include controlling the infusion of the component by controlling the distribution of the perforations, the density of the perforations or the size of the perforations. The method further includes flowing resin onto the caul sheet at a generally central location on the caul sheet.

According to a further embodiment, a method is provided of fabricating resin infused composite parts comprising placing a perforated caul sheet over a fiber component, and then infusing the fiber component with resin. The infusion may include controlling the flow of resin into the component using the caul sheet.

BRIEF DESCRIPTION OF THE ILLUSTRATIONS

FIG. 5 is an illustration similar to FIG. 4 but showing the caul sheet having been separated from the infused component.

FIG. 6 is an illustration of a layup assembly for resin infusion in which the parts are partially exploded for clarity.

FIG. 7 is an illustration of a flow diagram of a method for resin infusion using the layup assembly shown in FIG. 6.

DETAILED DESCRIPTION

Figure 1:
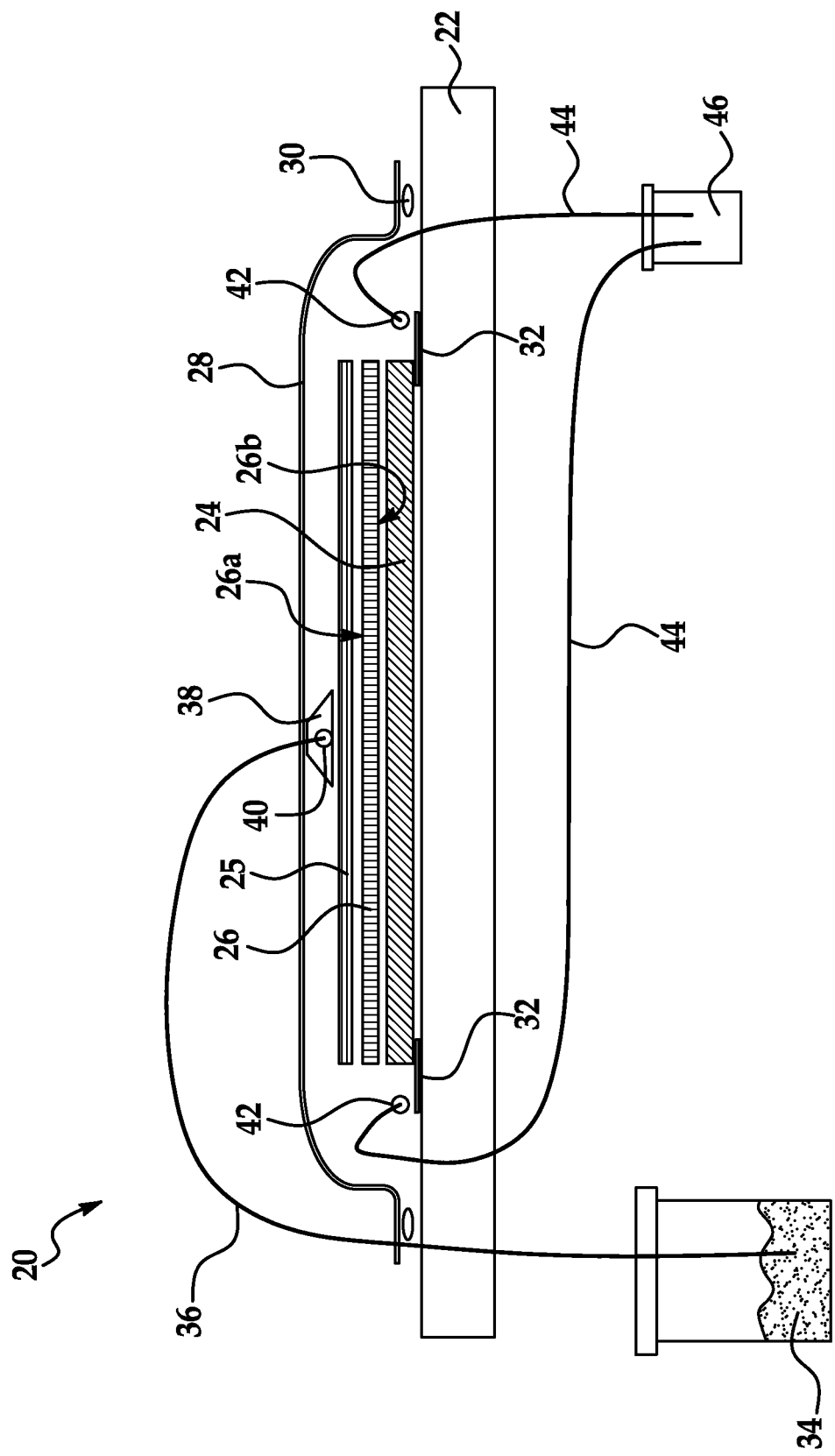
FIG. 1 is an illustration of a sectional view of apparatus for resin infusion of a fiber component.

Referring to FIG. 1, resin infusion apparatus 20 broadly comprises a tool 22, a fiber component 24 covered by a perforated caul sheet 26, resin distribution media 25, a vacuum bag 28 and a source of resin 34. As used herein, "component" and "fiber component" refer to a dry fiber or partially impregnated fiber component (also known as a "preform") that is to be infused with resin using a resin infusion process. The fiber component 24 may or may not have a shape that is preformed. Outlet consumables 32 are positioned between the tool 22 and the fiber component 24, and the caul sheet 26 rests directly on top of the component 24. The bag 28, which covers the component 24, the caul sheet 26 and the resin distribution media 25, is sealed to the tool 22 by means of a peripheral seal 30.

The source of resin 34 is coupled by a resin supply line 36 to an inlet port 38 which is generally centrally located over the caul sheet 26, inside the bag 28. Resin from the source 34 is introduced into the bag 28 through the inlet port 38 and flows through an inlet channel 40 and the distribution media 25 across and out over the caul sheet 26. Excess resin is removed from the bag 28 through outlet channels 42, outlet consumables 32 and an outlet (not shown in FIG. 1) where it is drawn through outlet lines 44 to an outlet vacuum reservoir 46. The central location of the inlet port 38 and inlet channel on the caul sheet 26 may assist in controlling the initial distribution of the resin 34 and formation of the wavefront 76 (FIG. 8) of the resin 34 as it flows over the caul sheet 26. The ability to control the initial distribution of the resin 34 over the component 24, and the tailored infusion of the component 24 made possible by the perforated caul sheet 26, may reduce variations in the fiber volume fraction of the cured part, thus improving part quality.

The placement of inlet port 38 in a substantially central location of caul sheet 26 may also assist in the quality of finish achieved on fiber component 24. Inlet port 38 and related distribution media may be positioned on a side of caul sheet 26 away from fiber component 24. Caul sheet 26 itself provides resin flow into fiber component 24 positioned under caul sheet 26. Thus during vacuum bagging and curing of fiber component 24, as described in the embodiments herein, inlet port 38 and other distribution media may not affect the finish provided to fiber component 24. For example inlet port 38 and resin distribution media may not leave visible marks, imprints, or indicia on fiber component 24 after curing. Visible inspection may not reveal markings from inlet port 38 and resin distribution media.

The inlet port 38 and inlet channel 40 rest directly on top of the distribution media 25 and the caul sheet 26. In other embodiments, the inlet port 38 and inlet channel 40 may be located at other positions on top of the caul sheet 26. In still other embodiments, one or more manifolds (not shown) may be coupled with the inlet port 38 to distribute resin to different locations on the caul sheet 26. The relative stiffness of the perforated caul sheet 26 allows the placement of the resin supply hardware, i.e. inlet port 38 and inlet channel 40, directly over the component 24 without causing any substantial part mark-off. Generally, locating the inlet port 38 and the inlet channel 40 centrally over the caul sheet 26 may result in minimum infusion times. The perforated caul sheet 26 may eliminate the need for use of a flow restricting peel ply (not shown) and may optimize the resin supply to the component through variation and perforation density, and hence the ability to vary the quantity of resin supplied to particular regions of the component 24. In some applications however, in order to achieve a desired surface finish on the infused component 24, a peel ply (not shown) may be placed between the caul sheet 26 and the component 24.

Figure 2:
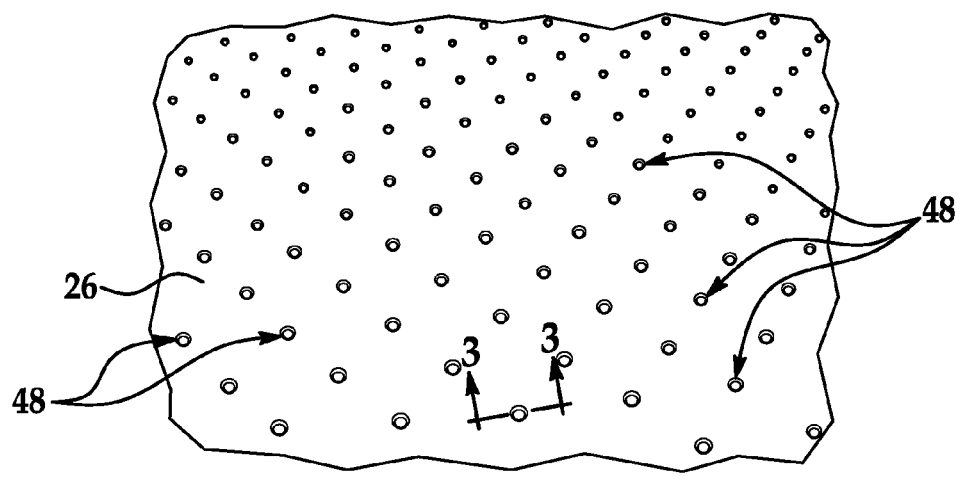
FIG. 2 is an illustration of an isometric view of a portion of the caul sheet used in the apparatus shown in FIG. 1.

Referring now to both FIGS. 1 and 2, the caul sheet 26 may be formed of any relatively rigid sheet material such as, without limitation, stainless steel or aluminum, having a surface finish suited to the application. Where it is desired to achieve a relatively smooth surface finish on the infused component 24, the caul sheet 26 should also have a relatively smooth surface finish since that finish will be substantially imparted to the component 24. In one typical application, the caul sheet 26 may have a thickness of approximately 0.8 to 2 mm, but may have any other thickness that is suitable for the particular application and manufacturing requirements. In some applications, for reasons discussed below, it may be desirable to select a material for the caul sheet 26 having a coefficient of thermal expansion (CTE) that is substantially different than that of the composite.

As used herein, the term "aerodynamically smooth" or "aerodynamically smooth surface" shall be understood to have the following meaning. An aerodynamically smooth surface applies to components of an aircraft configured to be exposed to airflow during normal flight operations. An aerodynamically smooth surface is a surface of the component having a sufficiently smooth surface such that the component may enter flight operations with no further smoothing treatment of the surface.

As previously described, the component may comprise a fiber material. A fiber material may include a weave or weave pattern defined by the individual fibers that comprise the component. In a precured or uncured condition the fiber component may indicate a surface with a weave pattern that is distinct and visible to an observer. The fiber component may have two surfaces with a distinct weave pattern on each of the two surfaces. However, after undergoing resin infusion and curing with the perforated caul sheet, according to the embodiments described herein, the weave pattern of one or both of the surfaces of the component may be substantially reduced. Resin infusion and curing of a fiber component with a perforated caul sheet may substantially reduce the weave pattern of the component such that the weave pattern is not visible to visual inspection by a human observer.

The caul sheet 26 may be formed into any shape, including flat and contoured shapes that match the final part shape and may have the ability to deform and thereby conform to the shape of the tool 22, including deforming under vacuum during processing. The caul sheet 26 has a multiplicity of perforations 48 therein through which resin may flow from the top 26a of the caul sheet 26 where it is distributed by the media 25, into the component 24 which is in face-to-face contact with the bottom 26b of the caul sheet 26. The number, size, density, location and distribution of perforations 48 in the caul sheet 26 may vary, depending upon the configuration, geometry and thickness variations of the component 24. In one practical embodiment providing satisfactory results, for example and without limitation, the perforations 48 may have a diameter of between approximately 1.5 and 2.5 mm, spaced apart approximately 15 to 25 mm. In another practical embodiment providing satisfactory results, the perforations 48 may have a diameter of approximately 0.5 mm and may be spaced approximately 4 mm from each other.

As will be discussed below in more detail, the pattern, and distribution of the perforations 48 in the caul sheet 26 may vary from relatively dense to relatively sparse in order to suit the resin supply requirements of the underlying component 24. In fact, some areas (not shown) of the caul sheet 26 may be free of perforation 48 and thus impermeable where the underlying component 24 does not require an active resin supply from above. The number and diameter of the perforations 48 may also depend at least in part on the viscosity of the resin.

Figure 3:
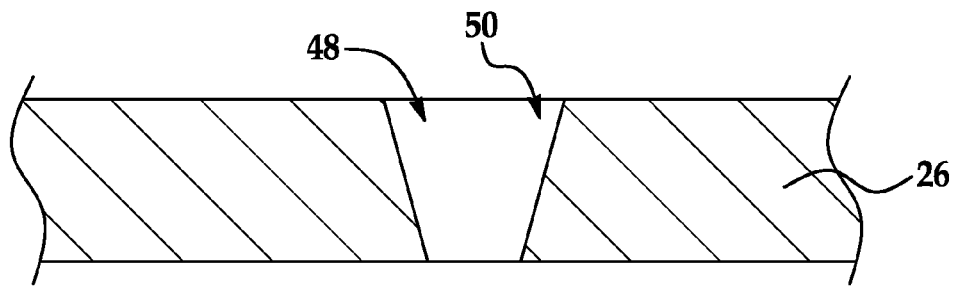
FIG. 3 is an illustration of a sectional view taken along the line 3-3 in FIG. 2.
Figure 4:
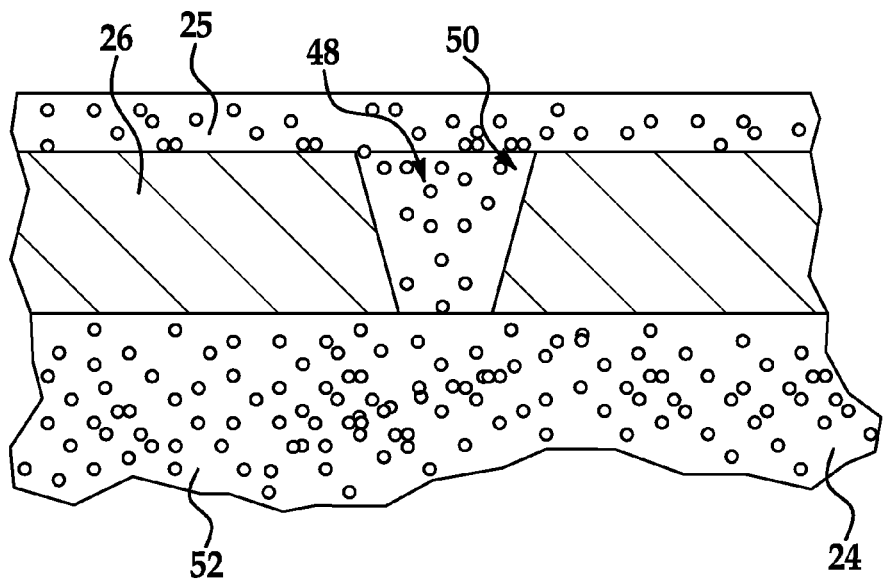
FIG. 4 is an illustration similar to FIG. 3 but showing resin having been infused into the component, wherein resin remains in the caul sheet perforations.

Referring to FIG. 3, the perforations 48 may have a taper 50 which may extend partially or completely through the caul sheet 26. FIG. 4 shows resin 52 having filled the distribution media 25 on top of the caul sheet 26 and passed through fully tapered perforations 48, leaving the perforations 48 filled with resin 52 following the infusion process and curing. Referring to FIG. 5, following curing of the resin 52, the caul sheet 26 may be separated away from the cured component 24, as shown by the arrows 56, resulting in a cured resin plug 55 being left in the perforations 52. Because of the tapering 50, the plugs 55 may be removed from the caul sheet 26 when the resin distribution media 25 is peeled away from the top of the caul sheet 26. In the illustrated embodiment, wherein the taper 50 extends through the entire depth of the perforations 48, the plugs 52 may break away cleanly from the surface 24a of the component 24, and leave a substantially smooth surface 24a that is substantially free of marks. In applications where the CTE of the caul sheet is substantially different than that of the composite 52, shrinkage of the caul sheet 26 during cool-down following curing may result in shearing of the resin plugs from the underlying cured component 24, thereby facilitating separation of the caul sheet 26 from the cured component 24.

Attention is now directed to FIG. 6 which illustrates another tooling arrangement in which a curved caul sheet 26 is used in combination with an IML (inner mold line) tool 58 having an IML tool surface 60. In this example, the component 24 is placed between the caul sheet and the IML tool surface 60. Resin infusion inlets/outlets and associated channels are not shown in FIG. 6. for simplicity of description. Resin distribution media 25 and a vacuum bag 28 are placed over the caul sheet 26. Although not shown in the Figure, the bag 28 is sealed (not shown) around its perimeter to the tool 58. In this example, resin introduced into the bag 28 is distributed across the caul sheet 26 by the distribution media 25 and passes through the perforations 48 in the caul sheet 26, infusing the fiber component 24. The bag 28 compacts the component 24 between the IML tool surface 60 and the OML tool surface 62 defined by the caul sheet 26. This arrangement results in a finished part having substantially smooth IML and OML surface finishes, while avoiding the need for consumables between the tool 58 and the component 24, as well as the need for complex female tooling. The relatively smooth IML and OML surface finishes that remain on the part may reduce or eliminate the need for further surface finishing operations following part curing.

As shown in FIG. 6, tool 58 may comprise a curved tool surface 60. Component 24 may be placed on curved tool surface 60 such that component 24 may adapt the curvature of tool surface 60. Caul sheet 26 may comprise a flexible material. The flexible material of caul sheet 26 may render caul sheet 26 sufficiently flexible so as to flex to adapt to the curvature provided to component 24 by curved tool surface 60. Thus in one embodiment the curvature of tool 58 may provide a male curved tool surface defining a curved IML. Component 24 may be placed directly onto tool 58, and caul sheet 26 may be placed directly onto component 24. Sealing and vacuum bag curing may proceed for component 24 without the use of further female tooling to adapt component 24 to the curved tool surface 60.

As shown in FIG. 6 where component 24 is in contact with curved tool surface 60, vacuum bagging consumables may be substantially absent between component 24 and curved tool surface 60. For example, a consumable such as a release film or release sheet may be absent between component 24 and curved tool surface 60. Where perforated caul sheet 26 is placed onto component 24, consumables may be substantially absent between perforated caul sheet 26 and component 24. For example, a consumable such as a breather ply may be absent between perforated caul sheet 26 and component 24.

The absence of vacuum bagging consumables as described provides an advantage over prior methods of performing vacuum bagging operations. Moreover, the performance of vacuum bagging in the substantial absence of vacuum bagging consumables, while also providing good resin flow through the caul sheet, directed resin flow into a component, and good surface finish of the component, provides economic and performance advantages over the prior methods of vacuum bagging.

Still referring to FIG. 6, it is noted that the surface of component 24 that is in contact with perforated caul sheet 26 may be provided with a smooth surface including an aerodynamically smooth surface. The smooth surface is provided without the need or presence of female tooling. This bag-side surface, or non-tooled surface, is provided with a smooth surface because the flexible caul sheet 26 flexes so as to make good contact with component while the perforations within caul sheet 26 may be chosen with spacing and porosity so as to provide the smooth surface finish. Thus it is noted that the smooth surface finish of component 24 may also be present on the same side of component 24 to which the supply of resin is provided.

The description of FIG. 6 has been described with respect to male tooling and female tooling. The embodiments are not limited to any specific understanding or configuration with respect to the terms male tooling and female tooling. The embodiments and methods described herein may also be practiced with tooling having a contour or curvature on a surface as well as a contour or curvature in any corresponding tool or mandrel.

FIG. 7 illustrates the steps of a method of resin infusion using the previously described perforated caul sheet 26. Beginning at 64, a fiber component 24 is placed over a tool 58, such as that shown in FIG. 6. Next at 66, a perforated caul sheet 26 and resin distribution media 25 are placed over the fiber component 24. Vacuum bag 28 is then placed over the media 25, the caul sheet 26 and the tool 58. At 69, a vacuum is drawn in the bag 28, which compacts and consolidates the component 24. Finally, at step 70, the dry component 24 is infused with resin through the perforated caul sheet 26.

The method of FIG. 7 may also be used with a tool 58 having a curvature. The vacuum bagging of step 69 is sufficient so as to flex caul sheet 26 so as to substantially contact fiber component 24 and conform fiber component 24 to the curvature of tool 58. In such an embodiment, the need for female tooling may be eliminated. A vacuum bagging operation performed with a flexible perforated caul sheet provides sufficient force to conform to the desired curved shape of tool 58. The elimination of female tooling provides a further advantage of simplifying the vacuum bagging process.

Figure 8:
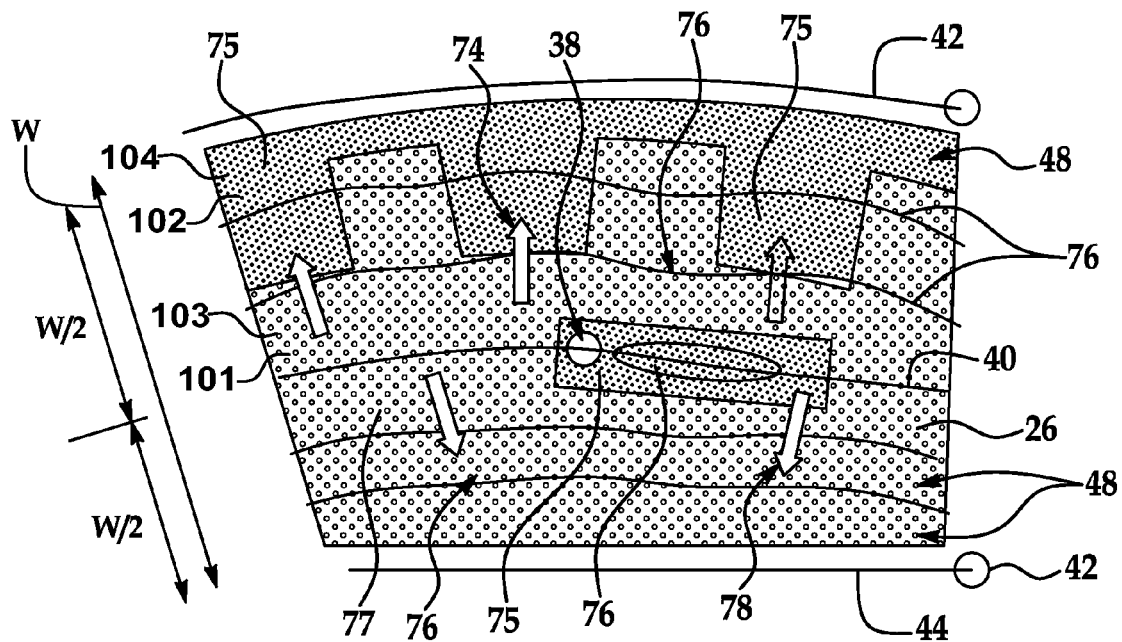
FIG. 8 is an illustration of a plan view of a portion of the resin infusion apparatus showing a caul sheet having differing perforation densities to achieve tailored resin infusion.

Attention is now directed to FIG. 8 which illustrates a perforated caul sheet 26 in which the relative permeability of the caul sheet 26 is different in certain areas of the caul sheet 26. This difference in permeability may be achieved by altering the size of the perforations 48 and/or the density of the perforations 48. In the example shown in FIG. 8, patterned areas 75 of the caul sheet 26 have a perforation density that is higher than that of other areas 77 of the caul sheet 26. This variation in density results in a variation of the permeability of the caul sheet 26, allowing better control of the infusion pattern of the resin supplied to the underlying dry component 24 (not shown in FIG. 8) through the caul sheet 26. Although not shown in the Figures, the caul sheet 26 may have areas that do not contain any perforations where the component 24 does not require an active resin supply.

A varying permeability in perforated caul sheet 26 may vary between first region 101 and second region 102 of perforated caul sheet. First region 101 may comprise a selected size and density of perforations so as to provide a first permeability. Second region 102 may comprise a different selected size and density of perforations so as to provide a second permeability. The first permeability may differ from the second permeability. By way of example only, a first permeability may be between about 1% and 2% open area, and second permeability may be between about 10% and 15% open area. When perforated caul sheet 26 is positioned over component 24, first region 101 may substantially overlay first area 103 of component 24, and second region 102 may substantially overlay second area 104 of component 24. First area 103 may have a different thickness than second area 104. In one embodiment, first region 101 comprises a higher permeability than second region 102, and first area 103 comprises a greater thickness than second area 104. FIG. 8 also illustrates the inlet port 38 and the inlet channel 40 located on top of and approximately half way across the width "W" of the caul sheet 26. This central positioning of the inlet port 38 and inlet channel 40 essentially halves the distance "W" that the resin must travel (W/2) in order to infuse the component 24, thus reducing resin infusion times compared to an arrangement where resin is fed from the side of the component 24. Although a single straight, centrally located inlet channel 40 is shown in the illustrated embodiment, multiple channels forming a manifold (not shown) may be used to distribute the resin, as previously mentioned.

Resin flows through inlet port 38 and along inlet channel 40, which results in the outward flow of resin through the resin distribution media 25 (not shown in FIG. 8) indicated by arrows 74 and 78, across the caul sheet 26. Wavefront contours representing lines of substantially even resin flow are shown at 76. The resin flow wavefronts 76 are controlled by the caul sheet 26. In the illustrated example, areas 75 of the caul sheet 26 having a higher density of perforations 48 overlie thicker portions (not shown) of the underlying component 24, while the areas 77 of the caul sheet 26 having a lower density of perforation overlie thinner portions (not shown) of the underlying component 24. The areas 75 having a higher density of perforations 48 result in additional resin being supplied to the corresponding portions of the underlying component 24. As a result, thick and thin areas of the component 24 may infuse at a substantially even rate, and the substantially even wavefronts 74 of resin flow may result in avoiding trapped-off areas.

Resin as used herein may comprise a fluid material including either a liquid phase or gas phase material. The embodiments described herein may operate with a liquid resin. A liquid resin may operate substantially without the presence of a gas resin. Alternatively a resin may comprise both liquid and gas materials.

The use of a caul sheet 26 having variable permeability over its area may be utilized to better control the infusion pattern and resin supply to the component 24 to achieve selectively variable but robust resin impregnation of the component 24. By varying the caul sheet permeability, a greater resin supply can be utilized in areas where it is required, for example in a thick area of the component 24 (underlying perforated areas 75), sometimes referred to as a ply pad-up, and a lesser supply is provided to thinner areas of the same component, such as those underlying perforated areas 77. The diameter of the perforations 48 in the caul sheet 26 may be varied in order to control the rate of resin infusion into the component 24. The variable permeability of the caul sheet 26 assists in achieving the desired infusion pattern, and may avoid undesirable flow characteristics such as trapped-off areas, voids and/or resin starved regions. Such infusion patterns may be optimized through infusion process modeling of the caul sheet 26, including the perforation pattern, and associated component layup.

Figure 9:
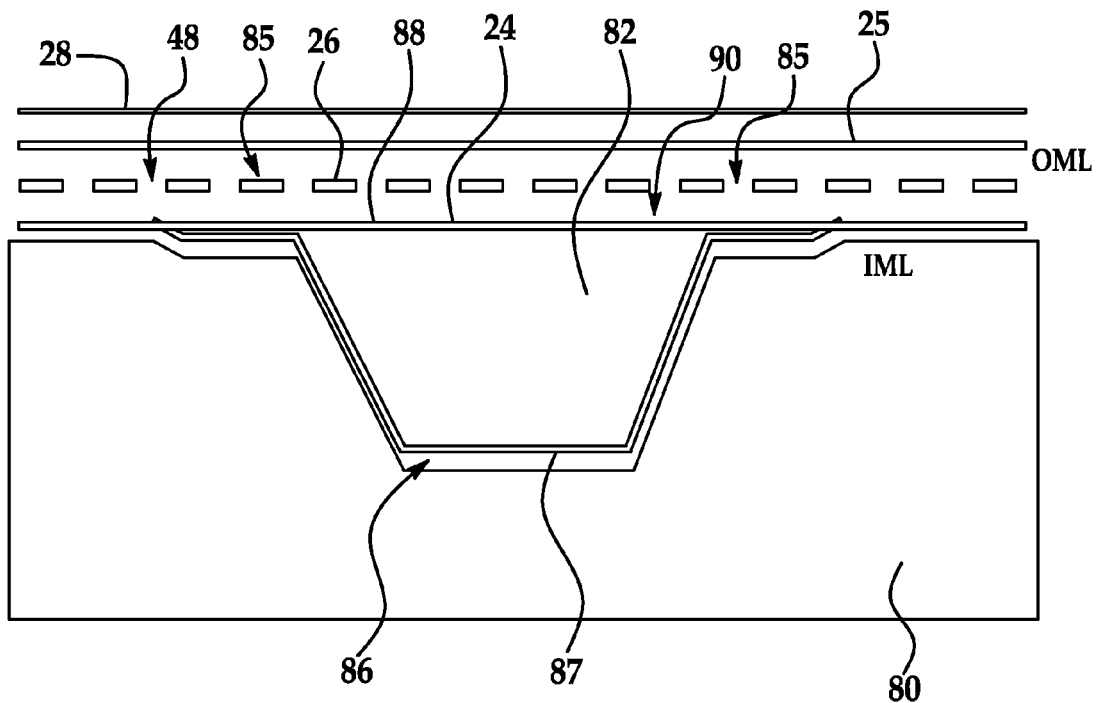
FIG. 9 is an illustration of a tooling and layup arrangement for resin infusion of integrated components.

FIG. 9 illustrates the use of a perforated caul sheet 26 as part of the tooling used to resin infuse a two piece integrated component 24 which in this example, comprises a hat-shaped stringer 88. The component 24 is placed in a cavity 86 in an IML tool 80, and a mandrel 82 is placed inside a hat-shaped component 24. The caul sheet 26 is placed over the base 90 of the stringer 88, and the bag 28 is placed over resin distribution media 25 and the caul sheet 26. The caul sheet 26 acts as an OML tool which imparts a substantially smooth OML surface finish to the stringer 88. This tooling arrangement avoids the need for infusion consumables to conform to internal tool structures and results in a smooth OML tool surface 90 on the base 90. The caul sheet 26 may includes a higher density and/or larger diameter perforations 48 in the area 85 overlying the hat section 87 to ensure that adequate resin is infused down into the hat section 87 of the component 24 within the cavity 86. Adequate resin infusion of the hat section 87 may also be achieved by introducing resin into the end (not shown) of the cavity 86, thereby infusing the hat section longitudinally in additional to the resin infusion achieved through the caul plate 26. The above arrangement is particularly advantageous in that it allows the use of simple tooling and simple arrangements of bagging and consumables, while resulting in parts having a smooth aerodynamic caul-side or bag-side finish.

Figure 10:
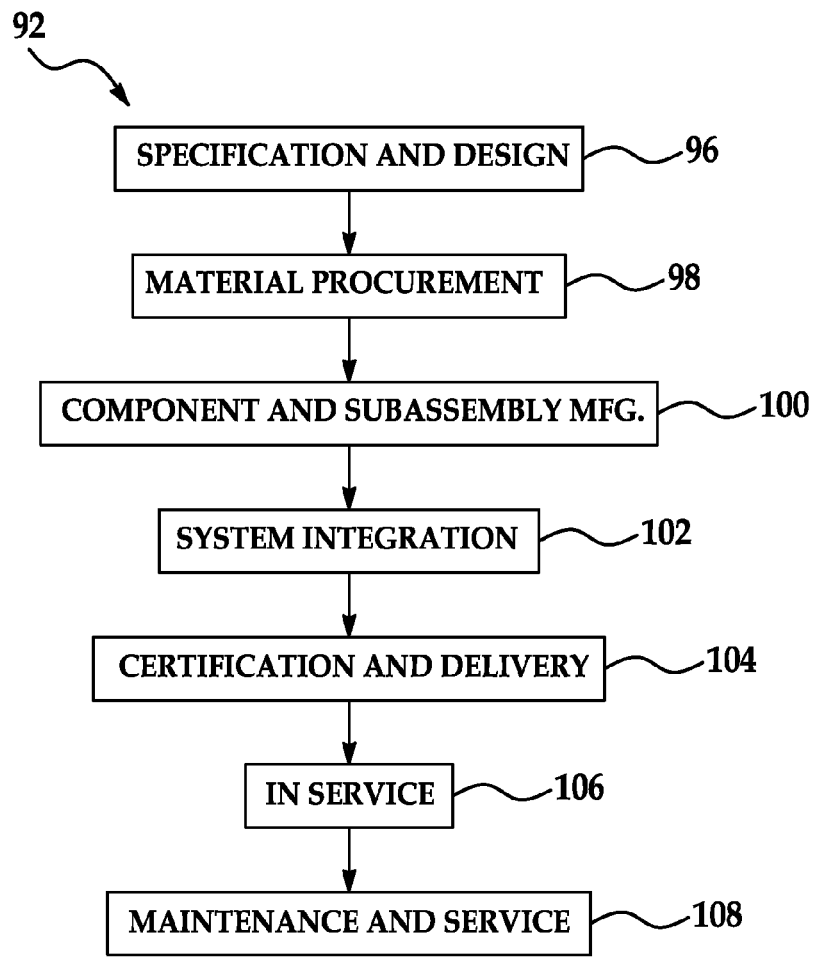
FIG. 10 is an illustration of a flow diagram of aircraft production and service methodology.
Figure 11:
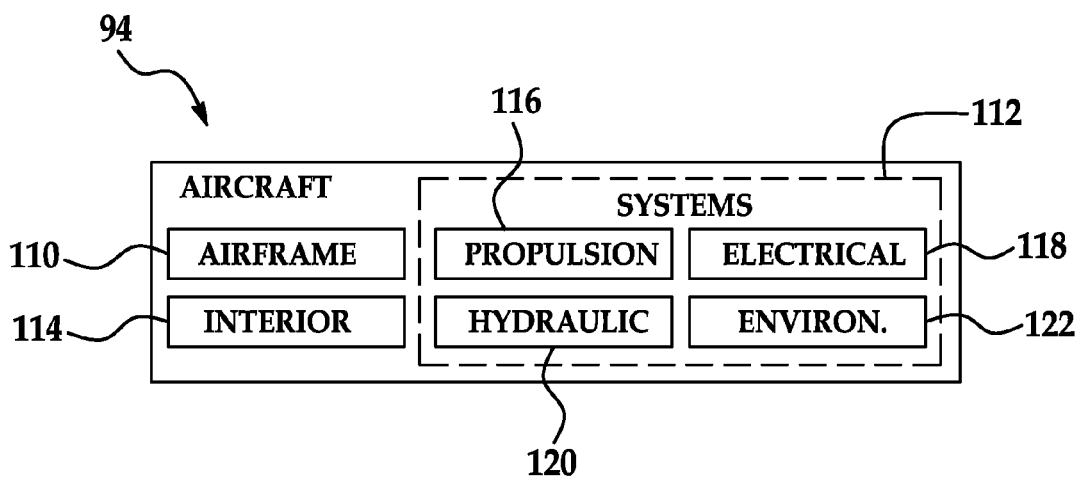
FIG. 11 is an illustration of a block diagram of an aircraft.

Referring next to FIGS. 10 and 11, embodiments of the disclosure may be used in the context of an aircraft manufacturing and service method 92 as shown in FIG. 10 and an aircraft 94 as shown in FIG. 11. During pre-production, exemplary method 92 may include specification and design 96 of the aircraft 94 and material procurement 98. During production, component and subassembly manufacturing 100 and system integration 102 of the aircraft 94 takes place. During step 100, the disclosed method and apparatus may be employed to fabricate composite parts such as fuselage sections which are then assembled at step 102. Thereafter, the aircraft 94 may go through certification and delivery 104 in order to be placed in service 106. While in service by a customer, the aircraft 94 may be scheduled for routine maintenance and service 108 (which may also include modification, reconfiguration, refurbishment, and so on).

Each of the processes of method 92 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 94 produced by exemplary method 92 may include an airframe 110 with a plurality of systems 112 and an interior 114. The disclosed method and apparatus may be employed to fabricate fuselage sections which form part of the airframe 110. Examples of high-level systems 112 include one or more of a propulsion system 116, an electrical system 118, a hydraulic system 120 and an environmental system 122. Any number of other systems may be included. Although an aerospace example is shown, the principles of the invention may be applied to other industries, such as the automotive industry.

The perforated caul sheet as described herein may also be reused in multiple vacuum bagging operations. Upon completion of a first vacuum bagging operation, the perforated caul sheet may be cleaned of excess resin. Resin that may be present in the perforations may be removed through a variety of operations. For example, the caul sheet may be subjected to heating or cooling cycles to dislodge the resin, including heating the caul sheet to a sufficiently high temperature to melt the resin. The resin may also be removed with a solvent. Additionally, resin plugs in the caul sheet perforations may be removed by providing a pressurized fluid such as air, water, or some other material so as to dislodge the resin plugs. Having cleaned the caul sheet and removed the resin plugs, the caul sheet may be applied in a new vacuum bagging operation.

The apparatus embodied herein may be employed during any one or more of the stages of the production and service method 92. For example, components or subassemblies corresponding to production process 100 may be fabricated or manufactured in a manner similar to components or subassemblies produced while the aircraft 132 is in service. Also, one or more apparatus embodiments may be utilized during the production stages 100 and 102, for example, by substantially expediting assembly of or reducing the cost of an aircraft 942. Similarly, one or more apparatus embodiments may be utilized while the aircraft 94 is in service, for example and without limitation, to maintenance and service 108.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a resin infused composite part, comprising:
   placing a fiber component on a tool;
   placing a perforated caul sheet over the component, wherein the caul sheet comprises: a first region with a first plurality of perforations having a first density of perforations and a first resin permeability; and a second region with a second plurality of perforations having a second density of perforations different from the first density of perforations and a second resin permeability different from the first resin permeability;
   providing resin to the caul sheet on a side of the caul sheet opposite the fiber component; and
   infusing the component with resin through perforations in the caul sheet such that resin flow through the first region differs from resin flow through the second region.

2. The method of claim 1, further including controlling the infusion of the component by controlling at least one of:
   the distribution of the perforations over the area of the caul sheet;
   the density of the perforations over the area of the caul sheet; and
   the size of the perforations.

3. The method of claim 1, further including placing resin distribution media over the caul sheet.

4. The method of claim 1, further including:
   flowing resin onto the caul sheet through inlet lines and ports positioned at a generally central location on the caul sheet.

5. The method of claim 4, further comprising:
   sealing the fiber component, the inlet lines, and the caul sheet in a vacuum bag;
   curing the fiber component; and
   removing the caul sheet, the steps of flowing, sealing, curing and removing performed such that a surface of the fiber component in contact with the caul sheet comprises a surface that does not indicate markings from the inlet lines to visible inspection.

6. The method of claim 1, wherein flowing resin comprises flowing a liquid resin.

7. The method of claim 1 further comprising:
   sealing the fiber component and caul sheet in a vacuum bag;
   curing the fiber component; and
   removing the caul sheet such that a surface of the component in contact with the caul sheet comprises an aerodynamically smooth surface.

8. The method of claim 7 further comprising: reusing the caul sheet in a subsequent vacuum bagging operation.

9. The method of claim 1, wherein the fiber component is characterized by a weave pattern, and further comprising:
   sealing the fiber component and caul sheet in a vacuum bag;
   curing the fiber component; and
   removing the caul sheet such that a surface of the fiber component in contact with the caul sheet comprises a surface that does not indicate the weave pattern to visible inspection.

10. A method of fabricating a resin infused composite part, comprising:

positioning a component in direct contact with a tool surface, the component comprising a first area having a first thickness and a second area having a second thickness;

placing a perforated caul sheet over the component such that a first side of the perforated caul sheet directly contacts the component, the perforated caul sheet comprising a first region with a first density of perforations and a first permeability and a second region with a second density of perforations different from the first density of perforations and a second permeability, the first region substantially overlaying the first area and the second region substantially overlaying the second area; and providing resin to a second side of the perforated caul sheet so as to infuse the component with resin such that resin flow through the first region differs from resin flow through the second region.

11. The method of claim 10, further comprising controlling the flow of resin into the component by selecting at least one of:

the location of the perforations;
the size of the perforations; and
the density of the perforations.

12. The method of claim 10, further comprising:
placing resin distribution media on the second side of the perforated caul sheet.

13. The method of claim 10, further comprising:
sealing a vacuum bag over the perforated caul sheet and the component; and
drawing a vacuum in the bag.

14. The method of claim 10, further comprising:
introducing a flow of resin onto the caul sheet through inlet lines positioned at a generally central location on the perforated caul sheet.

15. The method of claim 14, further comprising:
sealing the fiber component, the inlet lines, and the caul sheet in a vacuum bag;
curing the fiber component; and
removing the caul sheet, and the steps of flowing, sealing, curing and removing performed such that a surface of the fiber component in contact with the caul sheet comprises a surface that does not indicate markings from the inlet lines and ports to visible inspection.

16. The method of claim 13 further comprising:
curing the component;
removing the perforated caul sheet from the component;
cleaning resin plugs from the perforations in the perforated caul sheet; and
using the perforated caul sheet in a subsequent vacuum bagging operation.

17. The method of claim 10 further comprising removing the perforated caul sheet from the component such that a surface of the component in contact with the caul sheet comprises an aerodynamically smooth surface.

18. The method of claim 10, wherein the fiber component is characterized by a weave pattern, and further comprising:
sealing the fiber component and caul sheet in a vacuum bag;
curing the fiber component; and
removing the caul sheet such that a surface of the fiber component in contact with the caul sheet comprises a surface that does not indicate the weave pattern to visible inspection.

19. A method of fabricating a composite part, comprising:
placing a component on a contoured surface of a tool such that the component directly contacts the surface of the tool;

placing a caul sheet over the component such that a first side of the caul sheet contacts the component, the caul sheet comprising a first region with a first plurality of perforations having a first density of perforations and a first resin permeability; and a second region with a second plurality of perforations having a second density of perforations different from the first density of perforations and a second resin permeability different from the first resin permeability;

sealing a vacuum bag over the component and the caul sheet;

drawing a vacuum in the bag to compact the component between the tool and the caul sheet, the vacuum flexing the caul sheet such that the caul sheet substantially contacts the component; and providing resin to a second side of the perforated caul sheet so as to infuse the component with resin such that resin flow through the first region differs from resin flow through the second region.

20. The method of claim 19 further comprising placing a resin distribution media between the second surface of the caul sheet and the vacuum bag.

21. The method of claim 19 further comprising introducing the flow of resin into the bag through inlet lines at a generally central location of the caul sheet.

22. The method of claim 21, wherein the step of sealing comprises sealing the component, the inlet lines, and the caul sheet in a vacuum bag; and further comprising:
curing the component; and
removing the caul sheet, and the steps of flowing, sealing, curing and removing performed such that a surface of the component in contact with the caul sheet comprises a surface that does not indicate markings from the inlet lines and ports to visible inspection.

23. The method of claim 19 further comprising controlling the flow of resin into the component by selecting at least one of:
the location of the perforations;
the size of the perforations; and
the density of the perforations.

24. The method of claim 19 further comprising removing the caul sheet from the component such that a surface of the component in contact with the caul sheet comprises an aerodynamically smooth surface.

25. The method of claim 19 wherein the contoured surface and tool comprise a male tool.

26. The method of claim 19 further comprising:
removing the perforated caul sheet from the component;
cleaning resin plugs from the perforations in the perforated caul sheet; and
using the perforated caul sheet in a subsequent vacuum bagging operation.

27. The method of claim 19, wherein the fiber component is characterized by a weave pattern, and further comprising:
curing the fiber component; and
removing the caul sheet such that a surface of the fiber component in contact with the caul sheet comprises a surface that does not indicate the weave pattern to visible inspection.

* * * * *